Aug. 4, 1925.
E. T. PARSONS
1,548,378
LOAF EXTENDER
Filed Dec. 8, 1921 4 Sheets-Sheet 1
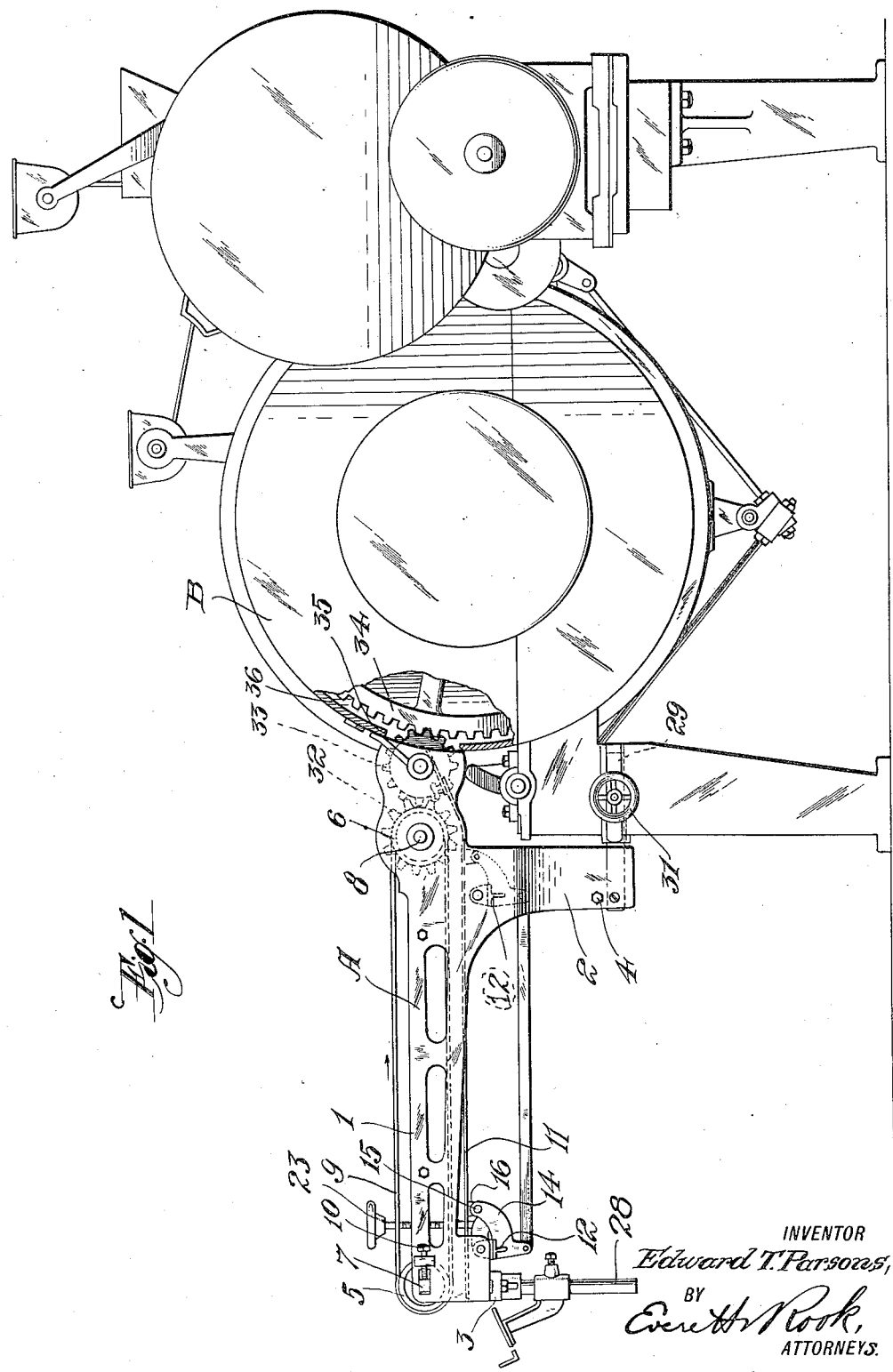
INVENTOR
Edward T. Parsons,
BY
Everett H. Rook,
ATTORNEYS.

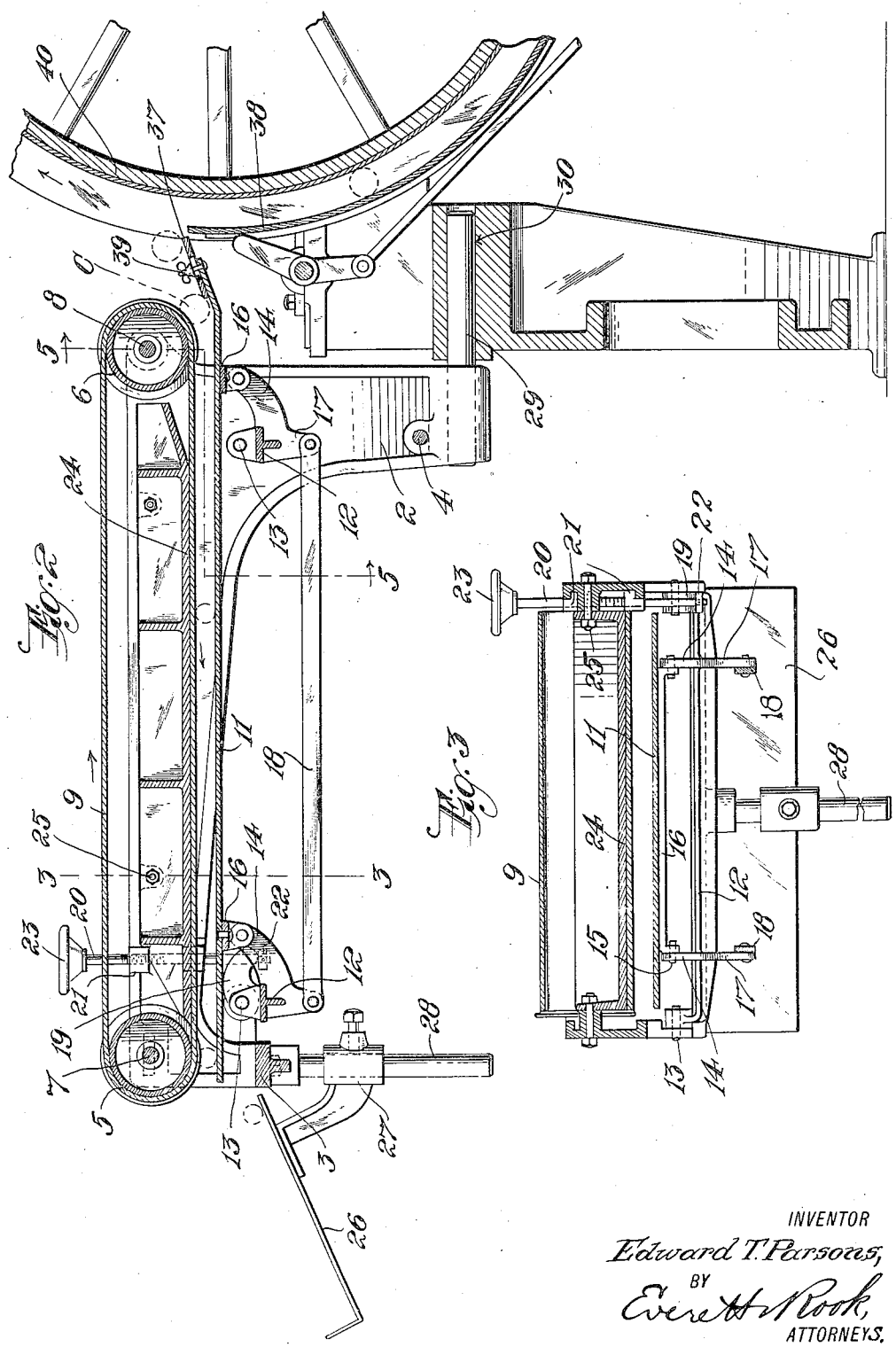

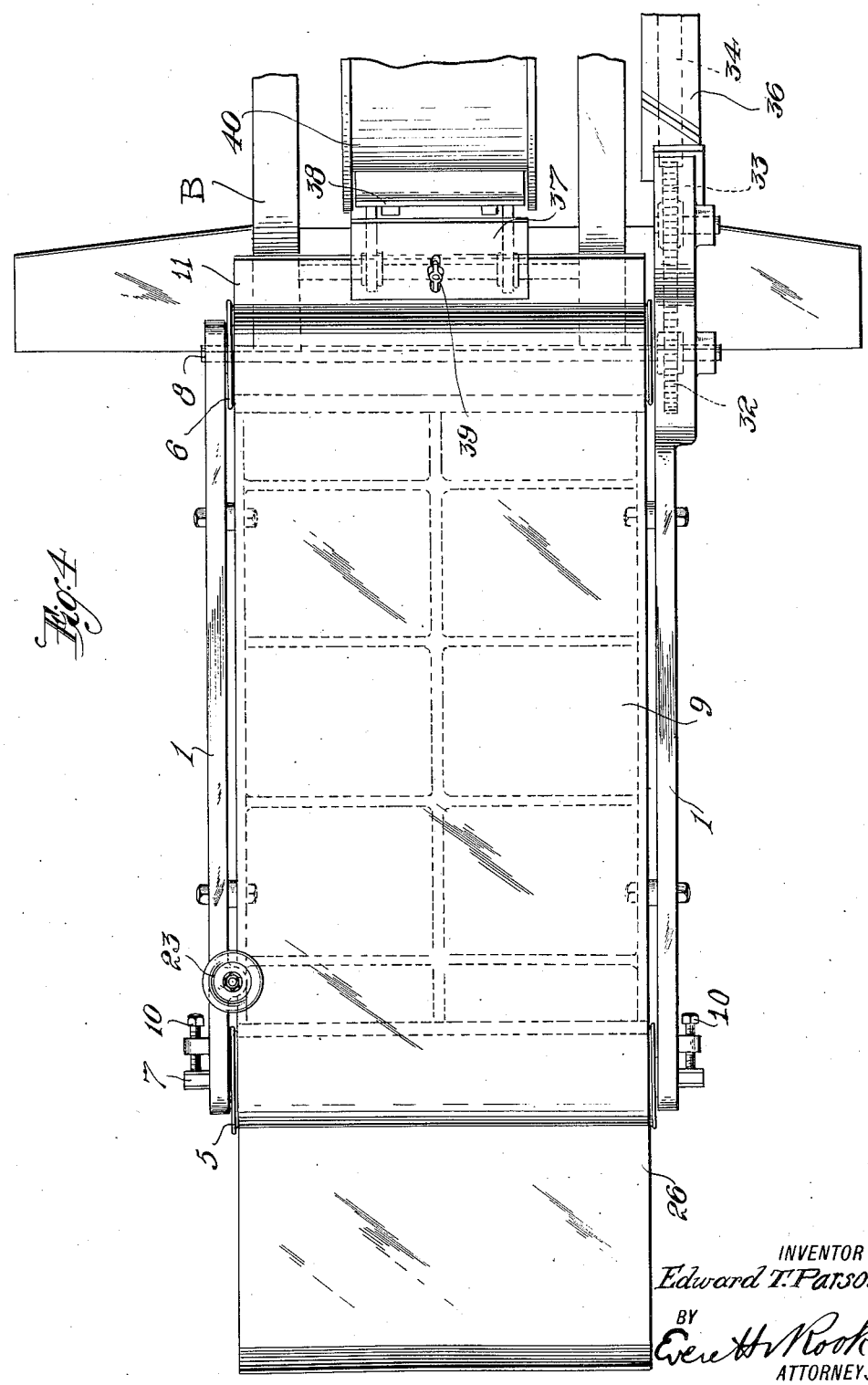

Aug. 4, 1925.
E. T. PARSONS
LOAF EXTENDER
Filed Dec. 8, 1921     4 Sheets-Sheet 4
1,548,378
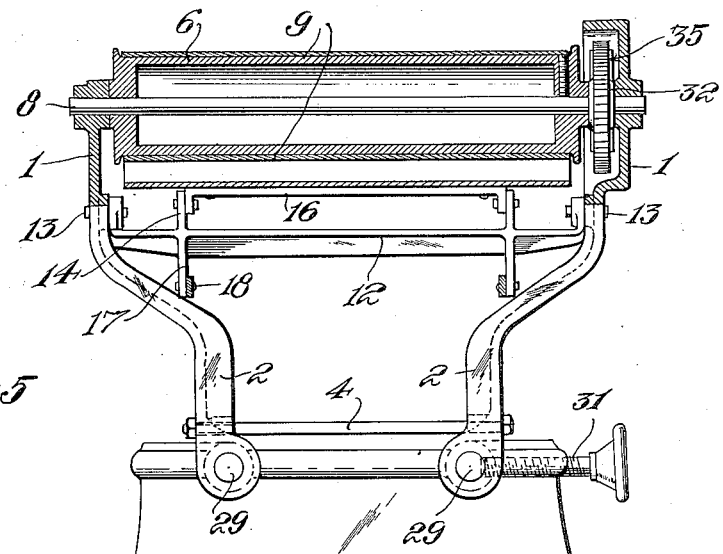
Fig. 5
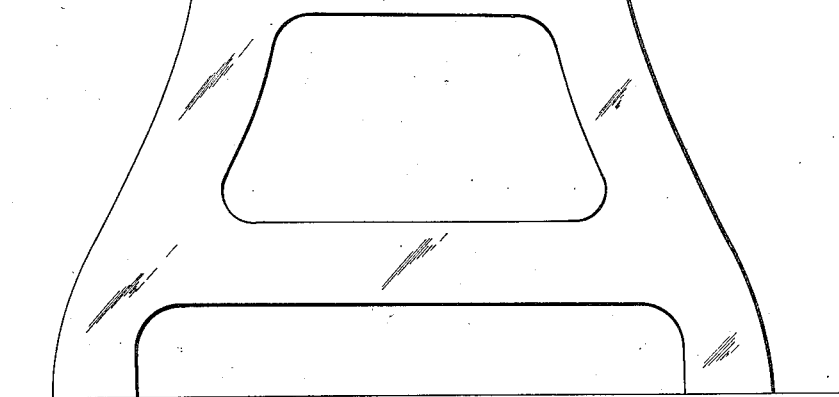
Fig. 6
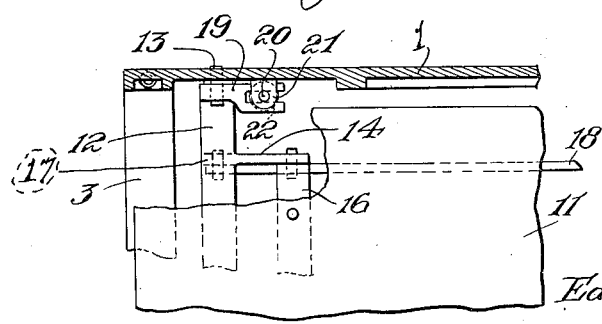
INVENTOR
Edward T. Parsons,
BY
Everett H. Rook,
ATTORNEYS.

Patented Aug. 4, 1925.

1,548,378

UNITED STATES PATENT OFFICE.

EDWARD T. PARSONS, OF NEWARK, NEW JERSEY, ASSIGNOR TO THOMSON MACHINE COMPANY, A CORPORATION OF NEW JERSEY.

LOAF EXTENDER.

Application filed December 8, 1921. Serial No. 520,847.

*To all whom it may concern:*

Be it known that I, EDWARD T. PARSONS, a citizen of the United States, and a resident of Newark, in the county of Essex and State of New Jersey, have invented new and useful Improvements in Loaf Extenders, of which the following is a specification.

This invention relates to a machine for increasing the length of a previously formed and kneaded loaf of dough by means of pressure produced by a pair of superposed relatively longitudinally movable surfaces spaced apart a distance less than the diameter of the formed loaf between which the loaf is rolled, the formed and kneaded loaf being fed into the space between said surfaces at one end and discharged in extended condition at the other end.

Among the objects of the invention are to provide a machine of the character described including a frame and a conveyor thereon embodying novel and improved features of construction whereby the frame may be easily and quickly connected to a loaf molder and said conveyor placed into a cooperative driven relation to the driving mechanism of the loaf molder in one and the same operation.

Further objects of the invention are to provide a combination of a loaf molder and a loaf extender embodying novel features of construction whereby the extender can be easily and quickly attached to the molder in position to receive the formed loaf directly from the molder; to thus form the extending machine frame with a pair of spaced longitudinally projecting arms and the molder frame at the discharge side thereof with a pair of corresponding openings or recesses to receive said arms, whereby the extending machine is solely supported on said molder by said arms with its receiving end adjacent the discharge end of the molder; to provide novel and improved means for adjusting the driving connection between said loaf molder and the conveyor of the loaf extender, and to obtain other results and advantages as may be brought out by the following description.

Referring to the accompanying drawings, in which like numerals of reference indicate the same parts throughout the several views, Figure 1 is a side elevation of a loaf extender embodying my invention showing the same attached to a modern type of loaf molder, portions of the loaf molder being broken away to show the driving connection between the molder and the extender;

Figure 2 is an enlarged vertical sectional view through the loaf extending machine and a portion of the loaf molder;

Figure 3 is a transverse sectional view through the loaf extending machine taken on the line 3—3 of Fig. 2;

Figure 4 is a top plan view of the extending machine and a portion of the molder, as shown in Fig. 2;

Figure 5 is a transverse sectional view through the extending machine taken on the line 5—5 of Fig. 2 showing the same connected to the frame of the molder, and Figure 6 is a fragmentary plan and sectional view through the extending machine showing the adjusting mechanism for the pressure plate.

In the drawings the reference character A designates the loaf extending machine which is adapted to be used in combination with a modern type of loaf molder B. The loaf molder B is adapted to form dough into loaves of a given length and knead the same, and the extending machine A is adapted to receive the loaves from the molder and increase the length of the same to any desired extent. This combination of the loaf molder and loaf extender enables the formation of loaves in a wide range of lengths.

The loaf extending machine comprises a frame formed of a pair of spaced and parallel side pieces 1 formed at one end thereof with depending arms 2, the said side pieces being connected at their ends by a transverse strip 3 and bolts 4. Rollers 5 and 6 are mounted on the respective shafts 7 and 8 journaled horizontally in the ends of the side pieces 1, and have mounted thereon a conveyor belt 9, preferably formed of canvas. The shaft 7 is preferably adjustable longitudinally of the frame by any suitable means such as the set screw 10 in order to adjust the tension of the belt 9.

A pressure plate 11 is mounted between the side pieces 1 of the frame below the lower reach of the belt 9 and in spaced and preferably parallel relation thereto, the said pressure plate being adjustable toward and away from the belt 9 to vary the distance between the said plate and belt. For the purpose of supporting and adjusting the plate 11 I preferably utilize a cross rock bar 12 at each end of the frame which is pivotally mounted at 13 between the side pieces, the said rock bars being formed adjacent their ends with upturned arms 14 pivotally connected at 15 to the ends of strips 16 secured to the bottom of the pressure plate 11. The cross bars 12 are also formed with depending arms 17 which are pivotally connected by links 18 extending longitudinally of the machine, whereby simultaneous and equal movement of the cross bars is obtained. One of the cross bars 12 is provided with an additional laterally projecting bifurcated arm 19 in the bifurcation of which is loosely received the end of an adjusting screw 20 threaded in lugs 21 formed on one of the side pieces 1. The said end of the screw 20 is provided with a collar 22 which underlies the end of the arm 19, and the other end of said screw is formed with an operating handle or wheel 23. With this construction it will be observed that rotation of the screw 20 to cause the same to move upwardly will swing the arm 19 and cross bars 12 so as to move the pressure plate 11 toward the belt, while movement of the screw in the opposite direction will allow the pressure plate by its own weight to move away from the belt.

In the operation of the loaf extending machine the belt 9 is driven in the direction indicated by the arrows, and the pressure plate 11 is positioned a distance from the lower reach of the belt less than the diameter of the previously formed and kneaded loaf which is to be extended. The loaf, indicated by dot and dash lines on Figure 2, is deposited in the space between the lower reach of the belt and the plate 11, as indicated at C on Figure 2, whereupon the belt will draw the loaf into said space and roll the same longitudinally of the machine. The space between the belt and the plate being less than the diameter of the loaf, when the loaf enters said space it is compressed into an oval cross section, and is gradually lengthened and rounded as it passes toward the discharge end of the machine. To reenforce the lower reach of the belt against flexing as the loaf passes between it and the pressure plate, a backing plate 24 is arranged at the side of the lower reach of the belt opposite the pressure plate, the said backing plate being mounted in any suitable manner as by the bolts 25 on the side pieces 1 of the frame. The extent of elongation of the loaf will obviously be determined by the pressure exerted thereon which is in turn determined by the distance of the pressure plate 11 from the belt. The pressure plate and belt being substantially horizontal, very little pressure is necessary to cause the required frictional contact of the belt with the loaf to convey the same through the machine, and thus only sufficient pressure is necessary to elongate the loaf to the desired extent. This elongating pressure is much less than the pressure exerted on the loaf in the molding machine for kneading the loaf, so that the loaf is in no way injured or the quality thereof impaired by excessive kneading in the extending machine, and furthermore only a small amount of power is required for driving the belt 9. The elongated loaf is discharged from the machine upon a plate or pan 26 adjustably mounted by means of a bracket 27 on a vertical post 28 secured to the transverse strip 3, from which pan the loaf may be placed in a baking pan or otherwise disposed of.

For connecting the extending machine to the molder B, the arms 2 of the side pieces 1 are each formed with a laterally projecting rod 29 which is adapted to removably fit a corresponding opening 30 formed in the frame of the molder at the discharge end thereof. The frame of the molder has threaded therein a clamping screw 31 for engaging one of the rods 29 to securely hold the same in position.

The belt 9 of the extending machine is driven from the loaf molder mechanism, and for this purpose I provide the inner shaft 8 with a gear 32 which meshes with an idler 33 journaled in an extension of one of the side pieces of the frame A, which idler is adapted to mesh with the driving gear 34 of the loaf molder drums through an opening 35 in the rear guard 36. With this construction it will be seen that by merely sliding the rods 29 into the openings 30, the loaf extender is bodily mounted on the frame of the loaf molder with the belt 9 in proper relation to the drum 40 of the molder, and in the same operation the idler 33 is caused to mesh with the gear 34 of the drum 40 to establish a driving connection between the said conveyor and the gear 34. It will be understood that proper meshing of the idler 33 and gear 34 can be obtained through movement of the frame of the extending machine toward or from the loaf molder by longitudinal adjustment of the rods 29 in the openings 30. The end of the pressure plate 11 adjacent the molder is formed with an extension 37 adapted to bridge the space between said pressure plate and the pressure plate 38 of the loaf molder, the extension being held in adjusted position by an adjustable clamping screw 39.

The drum 40 of the loaf molder is of the modern construction and is adapted to form and knead with the pressure plate 38 a loaf of a certain size, and in the operation of the combination of the extending machine and the molder, the loaf is rolled upwardly on the pressure plate 38 by the rotation of the drum 40 until it reaches the upper end of the pressure plate, whereupon it rolls by gravity downwardly over the extension 37 of the pressure plate 11 into the space between the belt 9 and the said pressure plate. It will thus be seen that this operation is automatic, and that while the loaf molder forms a loaf of a certain length the extending machine in combination with the molder enables the production of any desired length of loaf. When only loaves such as formed by the molder B are desired, the extending machine may be removed from the molder by pulling the rods 29 from the openings 30. The post 28 forms a leg for the extender which in conjunction with the extensions 2 will support the extender in substantially horizontal position as a floor or like support.

The lower reach of the belt 9 and the pressure plate are shown as arranged substantially parallel to each other, but it may be under some circumstances desirable to arrange the belt and pressure plate at an inclination to each other so as to position the discharge end of the pressure plate closer to the belt than the feeding end thereof, which modification is clearly within the scope of the invention.

While I have shown and described a preferred embodiment of my invention, it will be understood that this is mainly for the purpose of illustrating the principles thereof, and that many modifications and changes can be made in the detail construction of the invention without departing from the spirit or scope thereof.

Having thus described the invention, what I claim is:

1. The combination with a dough molding machine having a frame, dough molding mechanism on said frame to discharge a loaf at one end thereof, and means for driving said mechanism, of a loaf conveyor comprising a frame having downwardly extending arms at one end, a conveyor mounted in said frame and having driving means adapted to engage said molding mechanism driving means, and cooperating means on said arms and said frame of the dough molding machine for mounting said conveyor frame upon the frame of the molding machine in position to receive a loaf from said molding mechanism and with said driving means in engagement and preventing relative movement of said frames except toward and away from each other.

2. The combination with a dough molding machine having a frame and a driving mechanism adjacent one end of said frame, of a loaf conveyor comprising a frame, conveying means and a driving mechanism for said conveying means, one of said frames having a socket therein, a rod projecting from the other of said frames and adapted to enter said socket and connect said frames with said driving mechanism in engagement, and means for clamping said rods in their sockets.

3. The combination with a dough molding machine having a frame, dough molding mechanism on said frame to discharge a loaf at one end thereof, and a gear for driving said mechanism, said frame being formed with sockets adjacent the discharge side of said mechanism, of a loaf conveyor comprising a frame having downwardly extending arms at one end, a conveyor mounted in said frame and having a gear adapted to engage said molding mechanism gear, rods projecting from the lower ends of said arms adapted to enter said sockets in the frame of the dough molding machine to mount said conveyor frame upon the frame of the molding machine in position to directly receive said loaf from the molding machine and with said gears in engagement, and means for securing said rods in said frames.

4. The combination with a dough molding machine having a frame and a driving mechanism adjacent one end of said frame, of a loaf conveyor comprising a frame, conveying means and a driving mechanism for said conveying means, one of said frames having a socket therein, a rod projecting from the other of said frames to longitudinally adjustably enter said socket and to connect said frames with said driving mechanism in engagement, said engagement of said driving mechanism being adjustable through relative movement of said frames by longitudinal movement of said rod in said socket, and means for clamping said rod against movement in said socket.

5. The combination with a dough molding machine having a frame, dough molding mechanism, a driving means for said mechanism, of a loaf conveyor comprising a frame, conveying means and driving means for said conveying means, cooperating means on said frames to connect said frames with said conveying means in proper relation to said dough molding mechanism and with said two driving means operatively connected, said cooperating means being relatively adjustable to permit relative movement of said frames to adjust the connection between said two driving means, and means for holding said cooperating means in adjusted relation.

6. The combination with a dough molding machine having a frame, a drum projecting above said frame adjacent one end thereof, and a gear for driving said drum, of a loaf conveyor comprising a frame having downwardly extending arms at one end, a conveyor mounted in said frame and having a gear adapted to engage said drum gear, and cooperating means on said arms and frame of the dough molding machine for connecting said frames with said gears in engagement and prevent relative movement thereof except toward and away from each other.

7. The combination with a loaf molding machine including a frame and loaf forming means to form dough into a loaf and discharge the same, said frame having a pair of elongated openings adjacent the discharge side of said loaf forming means, of a loaf conveyor including a frame having a pair of arms adapted to removably fit into said openings in the said frame of the molding machine to wholly support said conveyor upon the molding machine.

EDWARD T. PARSONS.